Dec. 21, 1965
MITSUJI IWANAGA ETAL  3,224,170
GAS PURIFICATION APPARATUS
Filed March 18, 1963
4 Sheets-Sheet 2
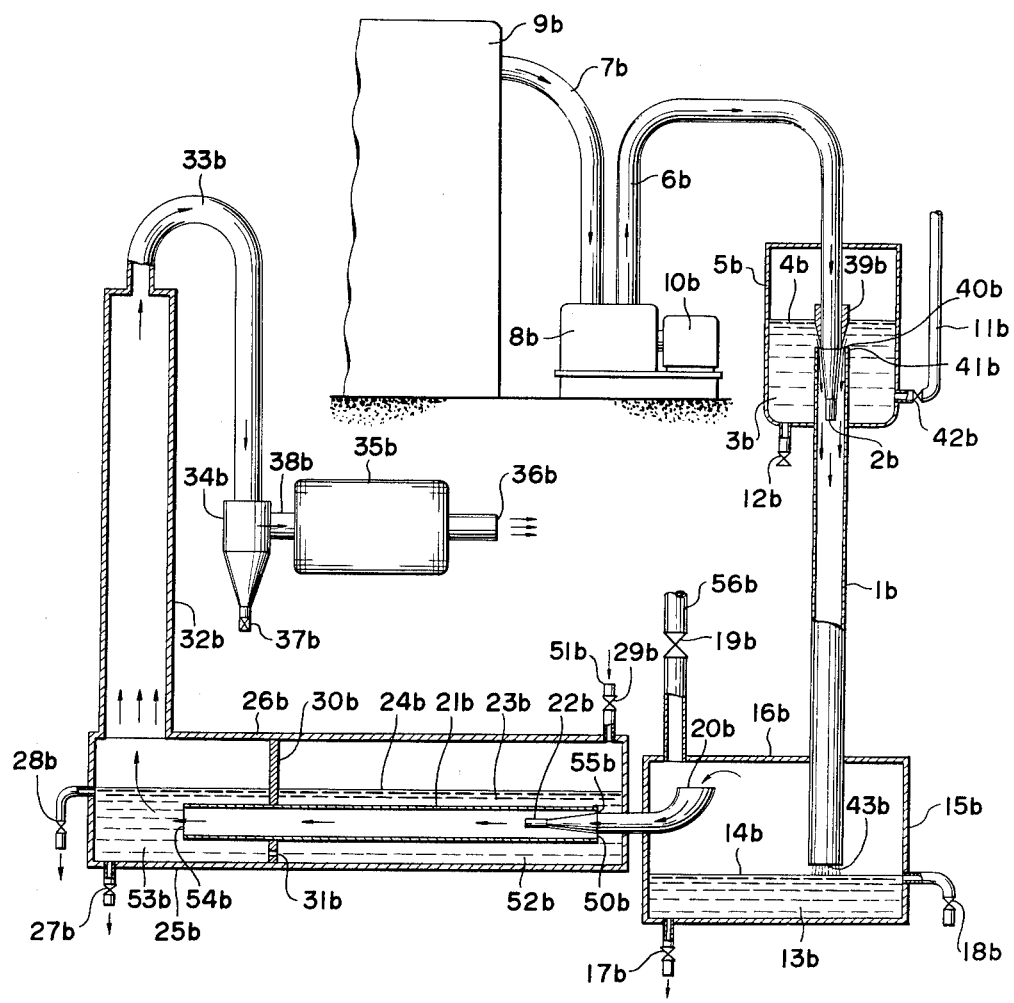
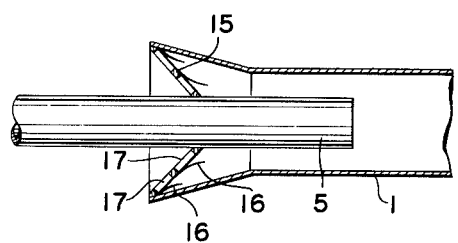

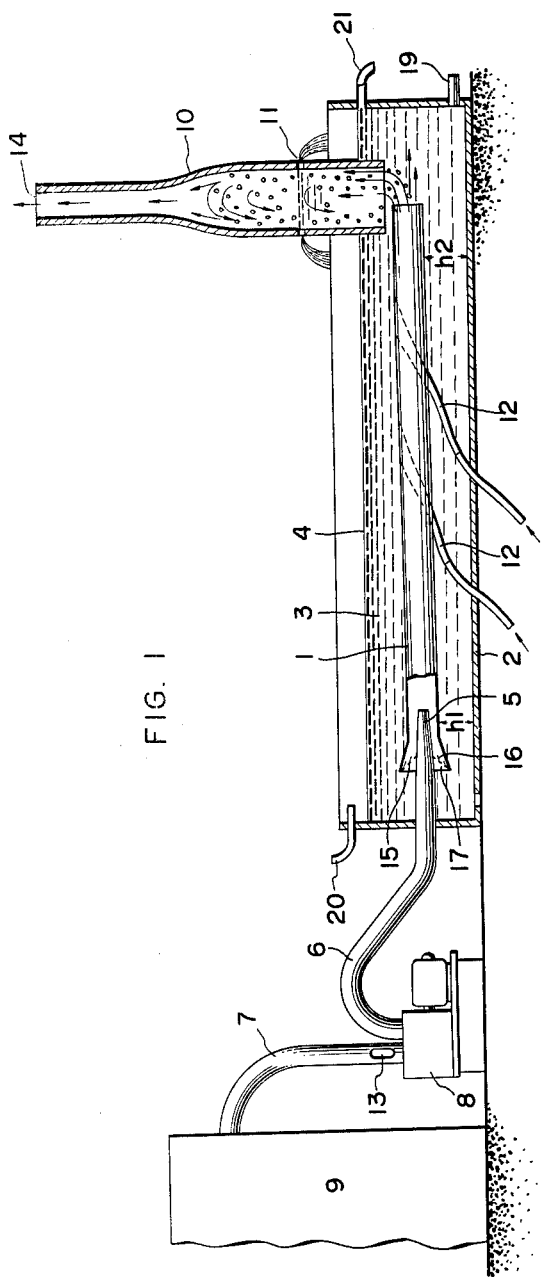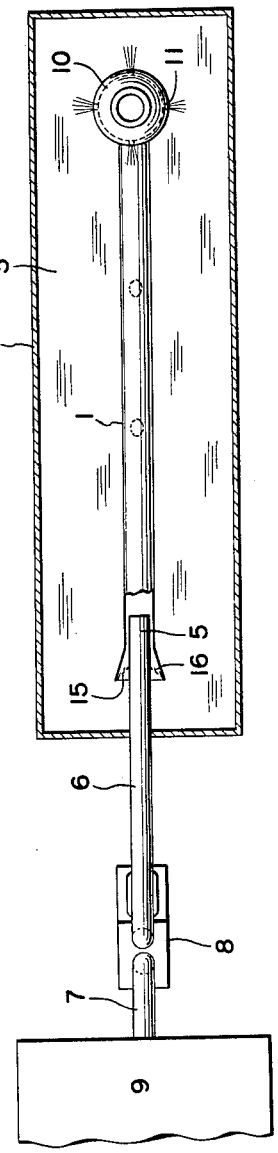

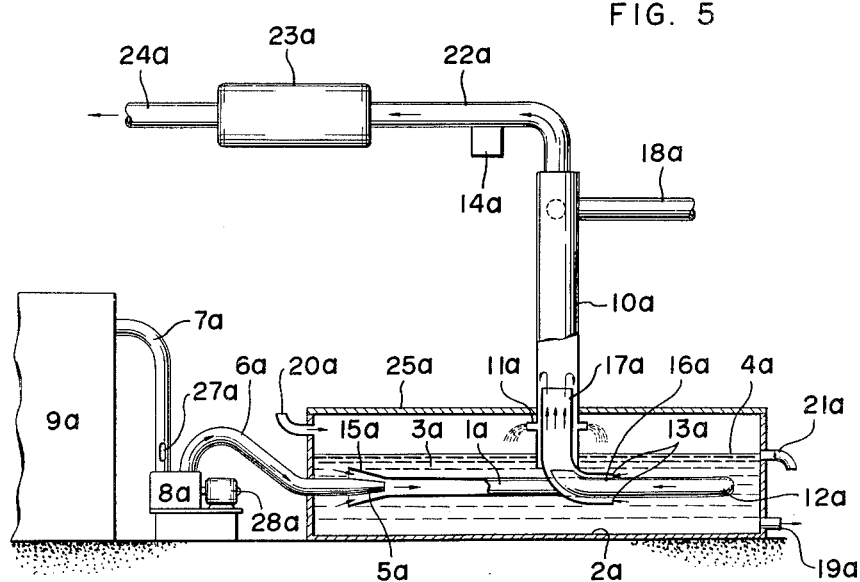
FIG. 5
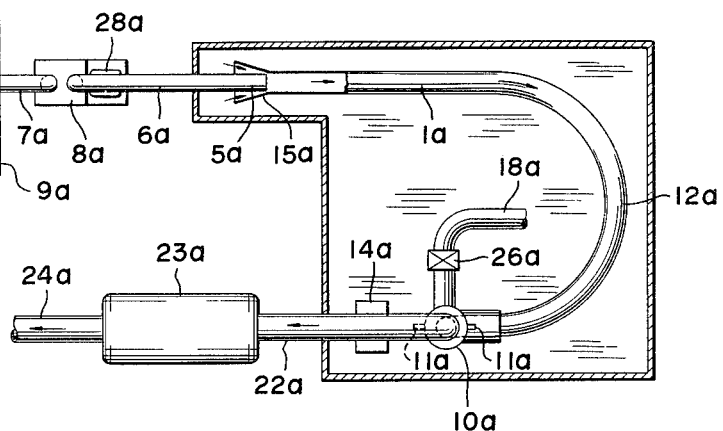
FIG. 6
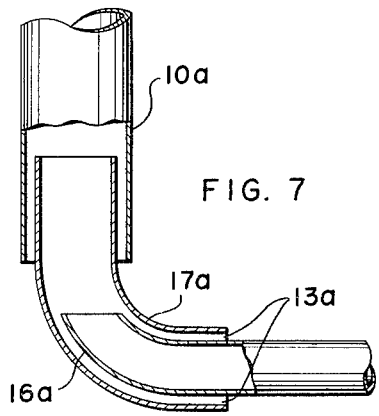
FIG. 7
FIG. 8

United States Patent Office 3,224,170
Patented Dec. 21, 1965

1

3,224,170
GAS PURIFICATION APPARATUS
Mitsuji Iwanaga, Kurume-shi, Japan, and Hiroshi Idemitsu, 375 4-chome, Torikai-machi, Fukuoka-shi, Japan; said Iwanaga assignor to said Idemitsu
Filed Mar. 18, 1963, Ser. No. 265,905
Claims priority, application Japan, Mar. 19, 1962, 37/9,975; Nov. 2, 1962, 37/48,440; Dec. 21, 1962, 37/76,272
4 Claims. (Cl. 55—256)

This invention relates to gas purification apparatuses, and more particularly it relates to a new gas purification apparatus with highly advantageous features for effective installation on city streets, in motor vehicle parking places, in ordinary dwellings, in buildings, and in sound-proofed rooms, or for effective installation in conjunction with boilers of steam generating plants, gas discharge devices of chemical plants, motor vehicles, and the like.

It is an object of the present invention to provide an apparatus which is to be installed in conjunction with boilers, motor vehicles, and other places where gases containing substances which are harmful or poisonous to the health of humans and animals are generated, and which is adapted to remove the said gases.

It is another object of the invention to provide an apparatus for purifying air which has been contaminated by the harmful substances and gases containing such substances which have been discharged from the above-stated sources of harmful gases.

It is a further object to provide an apparatus for removing, from air, harmful gases which have been generated by the physiological functions of animals and plants.

The nature, principles, and details of the invention will best be understood by reference to the following description of a few embodiments of the invention, when taken in conjunction with the accompanying drawings in which like parts are designated by like reference numerals, and in which:

FIG. 1 is a side elevational view, in vertical section, showing one embodiment of the gas purification apparatus according to the invention;

FIG. 2 is a plan view of the embodiment shown in FIG. 1;

FIG. 3 is an enlarged, fragmentary, side view of the partitioned end of the purification tube of the embodiment shown in FIGS. 1 and 2;

FIG. 4 is an enlarged end view of a wall disposed at the partitioned end shown in FIG. 3;

FIG. 5 is a side elevational view, partly in vertical section, showing another embodiment of the invention;

FIG. 6 is a plan view of the embodiment shown in FIG. 5;

FIG. 7 is an enlarged, fragmentary, side elevational view, partly in section and with parts cut away, showing the lower portion of the riser tube of the embodiment shown in FIGS. 5 and 6;

Figure 10:
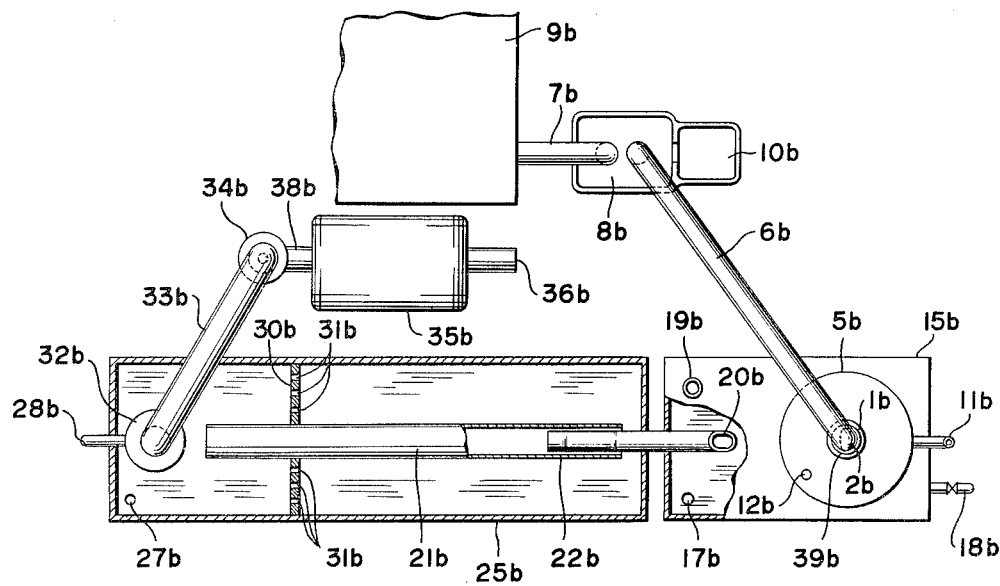
Figure 11:
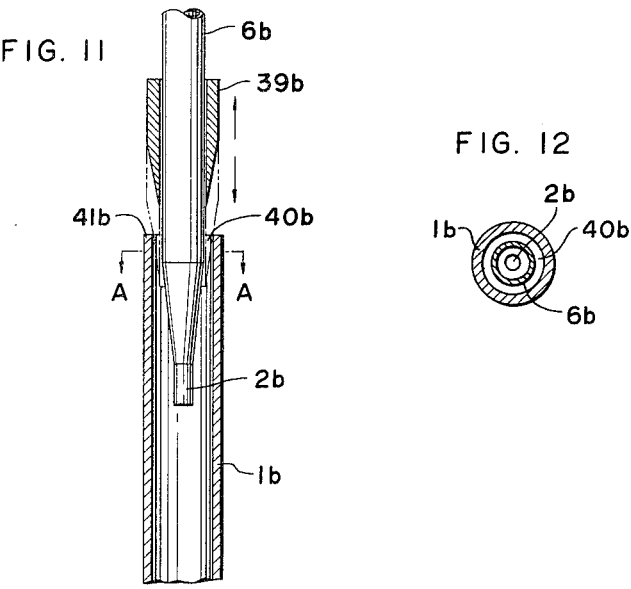
Figure 12:
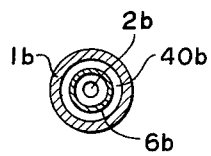

FIGS. 8 (A) and (B) are sectional views showing two examples of cross sectional configurations of a curved tube suitable for use in the embodiment shown in FIGS. 5 and 6;

FIG. 9 is a side elevational view, partly in vertical section, showing still another embodiment of the invention;

FIG. 10 is plan view, partly in section and with parts cut away, of the embodiment shown in FIG. 9;

FIG. 11 is an enlarged, fragmentary, elevational view, partly in section, showing the parts in the vicinity of the gas nozzle of the embodiment shown in FIGS. 9 and 10; and FIG. 12 is a sectional view taken along the line AA of FIG. 11.

2

Referring first to FIGS. 1 through 4, inclusive, which show one embodiment of the invention, a long purification tube 1 is disposed and supported at a shallow position below the liquid surface 4 of a purification liquid 3 contained in a liquid tank 2, the said tube 1 having a slight upward inclination, relative to the horizontal direction, toward its downstream end.

This downstream end of the purification tube 1 is open, and immediately thereabove, a funnel tube 10 is disposed vertically with its lower, large end disposed below the purification liquid surface 4 and immediately over the aforesaid downstream end of the tube 1. The other, or upstream, end of the purification tube 1 is partitioned by a partition 15 having purification liquid suction ports 17, the flow through which is controlled by vibrating check-valve reeds 16 fixed at their root ends to the partition 15 so as to permit the passage of only the fluid entering the interior of the purification tube 1 through the suction ports 17. Although these check-valve reeds in the present embodiment are of a lightly moving type similar to that used in harmonicas, valves of other types preventing reverse flow may also be used. A gas nozzle 5 is inserted through the partition 15 into the interior of the purification tube 1 in a direction substantially parallel therewith. Because of the aforementioned inclination of the tube 1, its partitioned, upstream end is disposed at a slightly lower depth than the open, downstream end. At intermediate points of the purification tube 1, on its upper or lower surfaces, holes are provided and connected to thin pipes 12 for introducing purification liquid so as to inject a portion of the purification liquid in an oblique direction into the purification tube 1.

A system for delivering gas containing harmful substances to be removed is connected between a source 9 generating this gas and the aforesaid gas nozzle 5 and comprises, in sequence in the flow direction, a gas suction pipe 7 connected at its upstream end to the source 9 and provided with a cooling air inlet 13, a blower 8, and a gas delivery pipe 6 connected at its downstream end to the nozzle 5. When the blower 8 is started with the cooling air inlet 13 suitably opened, the gas from the source 9 is adjusted to a suitable temperature and delivered through the above-described system to be injected at a high velocity into the upstream end of the purification tube 1. In the case of air purification, a room or a certain region of the atmosphere may be considered as being the source 9, in which case, temperature adjustment is unnecessary, but a noise suppressing device is preferably installed on the air suction opening.

In any case, when the gas is injected through the nozzle 5 into the purification tube 1, a portion of the purification liquid initially fully occupying the interior of the tube 1 is pushed by the said gas and is ejected out of the open end of the tube 1. During this action, since ejection of the gas out through the opposite end of the tube 1 is prevented by the closure of the check-valve reads 16, the gas is ejected out only through the open end. If both ends of the purification tube were to be open, the contaminated gas would not be purified at the start of operation and would escape into the surrounding air. Accordingly, when thorough purification is required, the purification tube should be open at only one end thereof. However, in the case when purification is to be carried out over a long period of time, or in the case when incomplete purification is sufficient, both ends of the purification tube may be left open.

When, after the blower is started, a certain portion of the purification liquid within the purification tube 1 has flowed out of the tube, a steady-state flow wherein gas and liquid are coexisting is formed within the said tube, and the gas and the purification liquid flow from the partitioned end toward the open end as they intimately contact each other. In this case, since the valve reeds of the liquid suction ports 17 are open, the continuous inflow of purification liquid is being permitted. It has been found that the time required for attainment of a steady-state flow of coexisting gas and liquid and stabilization of this flow as measured from the start of operation is extremely short.

The purifying action within the purification tube 1 will now be described in greater detail. The gas to be purified which is injected at high velocity from the nozzle 5 mixes with the purification liquid flowing in continuously through the suction ports 17 to form a gas-liquid coexistent stream, which flows through a relatively long distance (for example, approximately 50 to 90 cm. in the case when a blower of 400 watt to 1 kilowatt rating is used), during which the gas and the liquid coexist in a substantially uniform state over almost the entire cross section of the stream. Accordingly, during this flow, the greater part of the substances to be removed in the gas are trapped within the purification liquid. As the stream flows through the aforesaid distance, the fluid, as viewed in cross section of the tube 1, becomes principally liquid at the lower part, and at the upper part, gas containing liquid droplets flows. Then when, at a point past the separation point of the gas and liquid, purification liquid from a separate source is injected from a thin pipe 12, through a small hole in the tube 1, into the stream, the gas and liquid again become a coexistent stream, which flows for a certain time (covering, for example, a distance of approximately 50 cm. in the case when a blower of 400 watt to 1 kilowatt rating is used). By repeating this procedure by means of a second small hole and a thin pipe, a third coexistent mixture flow of the gas and liquid is created, and almost all of the substances to be removed are extracted by the purification liquid.

By the time the gas which has been purified to a considerable degree in the above manner and the purification liquid leave the open end of the tube 1, the liquid can be caused to flow along the lower side of the tube 1, and the gas to flow along the upper side by suitably selecting the length of the tube 1. When the length of the tube is so determined, the liquid leaving the tube 1 moves in a straight, axial direction, because of inertia, and mixes with the purification liquid in the liquid tank 2. On the other hand, the gas which is almost completely purified changes its direction of movement at the open end of the tube 1 and, turning upward, enters the funnel tube 10, carrying therewith some of the purification liquid in the tank. Consequently, the gas and liquid rise in a coexistent state to a level within the funnel tube 10 which is substantially higher than the liquid level 4 in the tank. Finally, the gas separates from the liquid and flows out, in a completely purified state, from the funnel tube 10 by way of an outlet tube 14.

It has been found that the above-mentioned level to which the gas and liquid rise in coexistent state can be caused to reach 15 to 50 cm. (in the case of a blower of 400 watt to 1 kilowatt rating). Accordingly, since the contact between the gas and liquid during this rising flow is good, the substances which were not removed in the purification tube 1 are completely removed within the funnel tube 10.

In order to prevent the purification liquid within the funnel tube 10 from remaining therein in a contaminated state, holes 11 are provided around the periphery of the funnel tube 10 at a level which is higher than the liquid level 4 in the tank 2, and the said liquid is caused to flow out. The liquid thus flowing out, as well as the liquid flowing out of the purification tube 1, join the purification liquid in the tank 2, and contaminants such as soot floating on the liquid surface are discharged out of the tank 2 through an overflow means 21. An inflow means 20 and a drainage means 19 are provided for changing the purification liquid in the tank 2.

In view of the wide range of application of the present invention, the details set forth above may be modified in various ways, as illustrated by the following examples. Although in the above-described embodiment, an example wherein purification liquid is injected into the purification tube 1 from the outside through thin pipes 12 provided at two points on the said tube, such injection points may be provided at three or more points in like manner depending on the degree of purification required. As another alternative, the purification tube 1 may be made extremely long, and the small holes and thin pipes 12 may be completely omitted. A blower 8 of low power rating may be used, and another exhaust fan, cleaner, and other parts connected to the outlet tube 14 of the funnel tube 10. In the case wherein the purified gas is to be drawn out, and, particularly in connection with the rate of combustion of equipment such as a boiler, the capacity of the blower 8 is to be limited, it is possible, in addition to drawing out gas from the outlet tube 14, to accomplish purification by providing a large-diameter section in an intermediate part of the purification tube 1, drawing out gas from the upper part of this large-diameter section, and delivering this gas to a second purification tube.

For purification of air in city streets, the suction pipe 7 of the blower 8 may be opened to the atmosphere, and the discharge outlet for the purified air placed in a place separated from the air intake port of the pipe 7. The said air intake port is prefereably provided with a noise suppressing device.

For air purification in motor vehicle enclosures such as garages and parking rooms, the air intake port is disposed in places where the motor vehicle exhaust gas is most concentrated, and the purified air is discharged in a suitable place in the room.

In the case when the apparatus of the present invention is to be used for purification of high-temperature gases from sources such as boilers and smelting furnaces, the gases may be cooled by water or some other means prior to their introduction into the blower so as to introduce these gases into the blower at a suitable temperature.

The impurities such as soot and minerals trapped by the purification liquid may be utilized or recovered by installing equipment such as a recovery device in conjunction with the apparatus of this invention. By the use of the apparatus of this invention, chimneys and smoke stacks are unnecessary. In the case when water is to be used as the purification liquid, it is possible, by treating the water which has been contaminated with trapped soot and other substances by means of devices such as separators, settling tanks, and filtration devices, and purifying this water to a certain degee, to economize on the quantity of water consumed, even in the case of purification of flue gases in a large scale power plant, and, moreover, to obtain raw material for production of carbon.

Another embodiment of the present invention will now be described hereinbelow with reference to FIGS. 5 through 8, inclusive. A tank 2a having a cover 25a is provided to contain a purification liquid 3a, in which there is disposed a curved tube 12a, which may have an arcuate form, a coiled form of one turn or several turns, or any other curved form.

A straight tube 1a forms one end of this curved tube 12a and has an open end 15a which is flared in the shape of a funnel and contains therein a gas nozzle 5a of a gas delivery pipe 6a, the said gas nozzle 5a being disposed and adapted to inject contaminated gas into the tube 1a.

The other (downstream) end 16a of the curved tube 12a is bent upward and is inserted and opens into the lower, open end of an elbow tube 17a which is also bent upward and, at its upper part, rises vertically out from the purification liquid 3a. The plane containing the centerline of this elbow tube 17a is positioned vertically. A gap 13a is formed between the downstream 16a and the elbow tube 17a and has a configuration which facilitates the rise of liquid therethrough. The extreme upper end of the elbow tube 17a is made to be at a higher level than the purification liquid level 4a. The straight, upper end portion of the elbow tube 17a is encompassed by the lower end of a long, vertical tube 10a having a substantially larger diameter than that of the elbow tube 17a, and the extreme lower end of this tube 10a is disposed either above or below the liquid level 4a. The vertical tube 10a is provided with several small holes 11a through its wall at a level below the afore-mentioned cover 25a of the liquid tank 2a.

A branch pipe 18a provided with a valve 26a is connected to a point near the upper end of the vertical tube 10a. The extreme upper end of the vertical tube 10a is connected to a vacuum-suction filter 23a by a connecting pipe 22a, which is provided at an intermediate point thereof with a water drainage valve 14a. The vacuum-suction filter 23a has a construction similar to that of an ordinary vacuum cleaner and is a unit containing a filter bag made of suitable material such as paper or fabric, a motor, a fan, and other parts. The gas which had been purified by this filter 23a is discharged into the atmosphere through an outlet 24a.

The cross-sectional configuration of the curved tube 12a may be similar to an ellipse as shown in FIG. 8 (B), or it may be circular as shown in FIG. 8 (A), or of some other suitable shape.

The foregoing purification apparatus is supplied with gas to be purified from a contaminated gas source 9a, such as a boiler or internal combustion engine, the said gas being drawn through a gas suction pipe 7a, which is provided with a cooling air inlet 27a, and delivered by a blower 8a driven by a motor 28a through the aforementioned gas delivery pipe 6a.

The purification liquid tank 2a is provided with a purification liquid inflow means 20a and a liquid drain means 19a for changing the purification liquid, and the liquid level 4a is maintained by means of an overflow means 21a.

The embodiment of the invention of the above-described construction and arrangement operates in the following manner.

When the blower 8a is driven by the motor 28a, contaminated gas containing contaminants such as soot is drawn from its source 9a through the suction pipe 7a into the blower 8a and is pressurized and delivered through the delivery pipe 6a to be injected at high velocity through the nozzle 5a into the straight tube 1a. Because of its high velocity, the gas so ejected induces a flow toward the interior of the tube 1a of the purification liquid from the flared opening 15a of the tube 1a, whereby a gas-liquid mixture stream flows through the curved tube 12a in the arrow direction.

As this mixture stream moves through a certain distance, the gas and liquid begin to separate above and below in the tube. Since the flow path in the vicinity of this separation point is curved in an arcuate shape or some other curved shape, the flow continues with the liquid displaced by centrifugal force toward the outer side of the curved stream, and the gas displaced to the inner side. The soot and other solid particles in the gas are also caused by centrifugal force to enter the purification liquid and thereby to be intercepted.

Then, when the gas stream and liquid stream flow from the extreme end 16a of the tube 12a into the elbow tube 17a, the flow of these fluids induces the purification liquid in the liquid tank 2a to be drawn upwardly through the gap 13a and to mix and contact the gas stream as fresh purification liquid, thereby purifying the gas further, and the mixture then enters the vertical tube 10a. Since the vertical tube 10a has a relatively large diameter, the gas flow velocity is reduced therein, and the liquid drops within the vertical tube 10a and returns to the interior of the liquid tank 2a, during which a small quantity of the liquid flows out of the tube 10a also through the small holes 11a and returns to the tank interior.

By opening the valve 26a and discharging the gas from the upper end of the tube 10a through the branch pipe 18a into the atmosphere, it is possible to determine the degree of purification obtained through only the purification liquid.

By operating the vacuum suction filter 23a with the valve 26a in its closed state, the gas which has moved upwardly through the vertical tube 10a and has been drawn through the connecting pipe 22a into the filter 23a is filtered by the filtering element such as a paper or fabric bag therein. The gas which has been so purified to a high degree of purity is discharged through the outlet 24a into the atmosphere. Any water condensing in the connecting pipe 22a is drained out by opening the drain valve 14a.

It is to be observed that, as described above, since contaminated gas flows at high velocity, together with purification liquid, through a curved tube in the above-described embodiment, the solid particles within the contaminated gas are effectively caused by centrifugal force to be intercepted and trapped in the purification liquid, and, moreover, since the gas is then passed through a vacuum filter, the gas is finally purified to a high degree of purity.

In a further embodiment, as shown in FIGS. 9 through 12, inclusive, of the present invention, a straight, long, and vertical purification tube 1b having a circular or some other simple cross section is so disposed that its upper end 41b extends upwardly through the bottom of a purification water tank 5b into the interior thereof, and, at the same time, the lower end of this tube 1b extends downwardly through the cover 16b of a water sump tank 15b into the interior thereof.

As shown in enlarged view in FIG. 11, a gas nozzle 2b of a gas delivery pipe 6b is inserted into the upper end interior of the purification tube 1b. The upper end 41b of the tube 1b and the nozzle 2b are so adapted that a relatively wide inlet 40b for purification water is formed therebetween. This inlet 40b is provided with a regulating valve 39b which is slidably fitted onto the outer peripheral surface of the delivery pipe 6b in the vicinity of the nozzle 2b. By the sliding adjustment of the vertical position of this valve 39b, the cross-sectional area of the inlet 40b is regulated between full opening and full closure.

The tank 5b is provided with a water supply pipe 11b having a shut-off valve 42b and a drain valve 12b. The height of the water level 4b of the purification water 3b in the tank 5b is adjusted to the required value by suitably adjusting the degrees of opening of the shut-off valve 42b and the valve 39b.

Similarly as in the preceding embodiments, contaminated gas is conveyed from a source 9b through a suction pipe 7b, a blower 8b driven by a motor 10b, and the delivery pipe 6b to the nozzle 2b.

The water sump tank 15b, which is fully closed by the cover 16b, is provided with a drain valve 17b, a drain-off valve 18b for removing floating substances on the water surface 15b, and an exhaust pipe 56b, provided with an exhaust valve 19b, for communication between the gas within the tank 15b and the atmosphere. In order to maintain a constant distance between the water level 14b of the purification water 13b which has accumulated in the tank 15b, the drain valve 17b is suitably opened to cause the water 13b to flow out under the force of gravity, or the water is forcibly drawn out by a drainage pump (not shown) provided downstream from the drain valve 17b. The tank 15b is further provided with a connecting pipe 20b disposed above the water level 14b for conveying gas out of the tank 15b to a second purification section as described hereinbelow.

The principal enclosure structure of this second purification section is a purification tank 25b containing purification water 23b of a surface level 24b, and having a cover 26b tightly covering its top and a partition 30b which divides the interior space into two compartments 52b and 53b. A horizontal purification tube 21b is disposed within the water 23b similarly as in the preceding first embodiment. A gas nozzle 22b connected to the downstream end of the afore-mentioned connecting pipe 20b is inserted into the upstream end 55b of the tube 21b.

The tank 25b is further provided with a water supply pipe 51b with a valve 29b, a drain valve 27b, and a drain-off valve 28b for removing substances floating on the water surface. A small communicating hole 31b is provided in the lower part of the partition 30b. In the case when economy of purification water is required, and maintenance of the purification water 23b is necessary, the small hole 31b is omitted so as to prevent the water in the compartment 53b from circulating into the compartment 52b. In this case, the water supply valve 29b and the drain valve 27b are suitably opened so as to prevent the purification water in the compartment 53b from overflowing out of the tank 25b.

The upstream end 55b of the horizontal purification tube 21b and the gas nozzle 22b inserted thereinto are so adapted as to form a relatively wide water inlet 50b therebetween. The purification tube 21b is disposed at a level below the surface level 24b of the purification water 23b and extends through the partition 30b so that its downstream end 54b opens into the water within the compartment 53b of the tank 25b.

The cover 26b of the tank 25b is provided with an opening to which the lower end of a straight tube 32b of large diameter is tightly fitted. The upper end of the straight tube 32b is provided with a flanged connection to a smaller-diameter gas passage pipe 33b, which is connected by way of a water extractor 34b and a connecting pipe 38b to a vacuum suction filter 35b. This vacuum suction filter 35b is similar to a vacuum cleaner and, by means of a filter element such as a fabric, paper, or some other material, filters the gas received from the pipe 38, discharging the purified gas through a discharge pipe 36b.

The above-described embodiment of the present invention operates in the following manner, the purification action being accomplished successively in the vertical purification tube 1b, the horizontal purification tube 21b, and the vacuum suction filter 35b.

The purification water 3b and 23b in the tanks 5b and 25b flow together with the gas to be purified in the tubes 1b and 21b, respectively, and, as a result of mixed flow and contact of the gas and water, contaminants such as soot, ash, and other solids, and sulfurous acid gas and other gaseous matter are extracted into the water, removed to the water surface, or dissolved in the water. Contaminant particles which are not removed in the tubes 1b and 21b are filtered out in the vacuum filter 35b.

The gas flow through the above-described apparatus is maintained by the blower 8b and the vacuum suction filter 35b. The water flow is maintained by the combination of gravity flow sustained by a water pump (not shown) and an ejector action due to the gas flow.

The above operation will now be described in greater detail hereinbelow. The regulating valve 39b and the drain valves 12b and 27b are closed, and water supply valves 42b and 29b are opened to supply purification water from water supply pipes 11b and 51b, respectively, into tanks 5b and 25b so as to provide the said tanks, respectively, with purification water 3b and 23b up to the required surface levels 4b and 24b. Next, the drain-off valves 18b and 28b and the exhaust valve 19b are closed, and the regulating valve 39b is opened, whereupon the water in the purification tube flows downwardly by gravity.

Then, when the blower 8b and the vacuum filter 35b are operated, contaminated gas from the source 9b is injected downwardly at high velocity from the nozzle 2b, similarly as in the case of the preceding embodiments.

At this time, the water which flows downwardly through the relatively wide inlet 40b is acted upon by the force of gravity and has a tendency to become a pulsating current in the tube 1b. Since, under this condition, the high-velocity gas current is jetted into this water, the flow of the two fluids becomes a turbulent mixture flow of countless gas bubbles and water droplets which moves downwardly to enter the sump tank 15b. In the tank 15b, the gas and water separate, the water collecting at the bottom of the tank 15b, and the gas accumulating thereabove.

During the intimate contacting of the gas and water in the tube 1b as described above, solid contaminants such as soot are intercepted by the water, and soluble contaminants such as sulfurous acid gas are dissolved in the water. Since the water 13b which has thus accumulated at the bottom of the sump tank 15b has contaminants such as soot floating on its surface 14b, these floating contaminants are discharged from time to time through the drain-off valve 18b with an outlet provided at the same level as the water surface 14b. Since the water 13b also contains therein contaminants in a mixed, absorbed, or dissolved state, it is drained out periodically as necessary through the drain valve 17b and suitably treated.

In order to check the purification action being accomplished in the purification tube 1b, the exhaust valve 19b is opened, and the gas in the tank 15b is sampled and analyzed. As a variation in arrangement, the exhaust pipe 56b may be connected to a second purification section which is the same as that of the purification tube 1a so as to repeat the first-stage purification treatment of the tube 1a.

When the exhaust valve 19b is closed, the gas which has undergone the first-stage purification treatment passes through the connecting pipe 20b and is injected through the nozzle 22b into the purification tube 21b. Since this gas flow is due to the combined power of the vacuum filter 35b and the blower 8b, the gas velocity of injection through the nozzle 22b is high, whereby the water in the tube 21b is accelerated, and a turbulent flow is caused, water being drawn into the tube 21b through the relatively wide inlet 50b, and a mixture flow of gas bubbles and water droplets being continuously formed.

During this purification treatment, since the contact between the gas and water is extremely good, the gas which has passed through the tube 21b and discharged from the downstream end 54b is highly purified. As the water level 24b of the purification water 23b is maintained continually above the purification tube 21b by opening and closing the drain valve 27b and the water supply valve 29b at suitable periods, floating contaminants are discharged by opening the drain-off valve 28b, and when the water 23b becomes contaminated, it is changed.

In the case when the degree of purification in the purification tube 1b is high, the water 23b used in the purification in the purification tube 21b is relatively clean. Therefore, this water 23b may be transferred by a pump (not shown) to the water supply pipe 11b, and fresh water supplied may be supplied to the tank 25b through the water supply pipe 51b. The draining of water through the drain valve 27b during purification operation is accomplished by means of a water pump (not shown).

The gas which has been discharged from the downstream end 54b of the tube 21b passes through the water 23b and, flowing through the straight tube 32b, the passage pipe 33b, the water extractor 34b, and the connecting pipe 38b, is drawn into the vacuum suction filter 35b to be discharged from the exhaust pipe 36b. During the gas passage through the vacuum filter 35b, the fine particles of contaminants remaining in the gas are removed by the filter element.

Depending on the requirements, the numbers of the purification tubes 1b and 21b may be increased, and these tubes may then be connected in series. In this case, various kinds of chemical solutions can be caused to flow, each through a respective purification tube, whereby various different contaminant gases within a contaminated gas mixture can be removed.

A particularly significant and effective feature of the above-described embodiment is the use of at least one vertical purification tube in which contaminated gas and purification water are caused to flow downwardly. By this arrangement the inflow of purification water is positively obtained, and, moreover, the mixing and mutual contacting of the contaminated gas and the purification water is furthered by the pulsating motion of the downwardly flowing water. Accordingly, the resulting purification is extremely effective.

For the purification liquid mentioned in the foregoing description, water and various chemical solutions are used. For harmful, poisonous gases, neutralizing solutions are used, and for deodorization, appropriate deodorant solutions are used.

The apparatus of the present invention can be used independently for purification of room air in various structures such as dwellings and buildings in areas where the degree of air contamination is high, or it can be used in conjunction with air cooling and heating equipment. This apparatus can also be used for removal of carbon dioxide gas from rooms provided with sound suppressing devices.

Furthermore, the apparatus of this invention can be effectively used for purification, particularly sterilization, of air in places such as hospitals, department stores, and theaters.

Thus, the present invention provides a purification apparatus of relatively simple construction which has an extremely wide range of applications and is highly effective in purifying unhealthful air and other gases.

Although the present invention has been described in conjunction with particular embodiments thereof, it is to be understood that various modifications and variations may be resorted to therein without departing from the spirit and scope of the invention, as those skilled in the art will readily understand, and such modifications and variations are to be considered as being within the purview and scope of the invention and appended claims.

What is claimed is:

1. A purification apparatus for city indoor air, flue gases, and the like comprising a purification liquid tank incompletely filled with a purification liquid, a purification tube which has an upstream end and a downstream open end and is disposed in the said purification liquid below the said surface level with a slightly rising inclination from its said upstream end toward its said downstream open end, a gas injection nozzle inserted concentrically within the said upstream end of the said purification tube, means for injecting a gas to be purified into the said purification tube, a partition means provided with reverse-flow-preventive valve means and disposed on said gas injection nozzle about its outer periphery so as to close the space between the said nozzle and the inner surface of the said upstream end of the said purification tube, a gas transfer system provided with a blower and a fresh air inlet and adapted to supply a gas to be purified from its source to the said gas injection nozzle, a plurality of tubes having smaller diameter than said purification tube leading into said purification tube at points intermediate its ends, means for the introduction of purification liquid into the said purification tube, a funnel tube provided with outflow holes about its peripheral wall above the surface of the purification liquid in said tank and disposed at one end beneath said surface level of said purification liquid directly above the said downstream end of the said purification tube in such a manner as to intercept all gas particles leaving the said downstream end of the said purification tube.

2. A purification apparatus for contaminated gases comprising a tank containing a purification liquid of a certain surface level, a curved tube having an open upstream end and an open downstream end, said downstream end being bent upwardly, a gas delivery pipe having its delivery opening within the said open upstream end and adapted to inject a contaminated gas to be purified into the said curved tube, a vertically disposed elbow tube concentrically encompassing said upwardly bent downstream end of the said curved tube with its lower portion, a straight riser tube which has a larger diameter than the said elbow tube and, at its lower end, is concentrically encompassed about the upper portion of the said elbow tube, and a vacuum filter to which the upper part of the straight riser tube is connected.

3. A purification apparatus for contaminated gases comprising a first purification tank containing a purification liquid, a purification tube extending downwardly from the interior of the said purification tank and having an upper end opening within the said purification liquid, an injection nozzle disposed within the said upper end of the said purification tube, means for injecting a contaminated gas to be purified downwardly into the said purification tube, a covered sump tank into which the lower open end of the said purification tube extends, a second purification tank containing purification liquid and a second purification tube within said second tank and disposed below the liquid level in said second tank and a connecting pipe conveying once-purified gas from the said sump tank to the said second purification tank, said connecting pipe terminating in an injection nozzle disposed within said second purification tube.

4. A gas purification apparatus comprising a horizontal purification liquid tank; purification liquid incompletely filling said tank; a purification tube traversing said tank below the liquid level and having an open upstream end and an open downstream end; a gas injection nozzle disposed within said upstream end; means for injecting a gas into said tube through said nozzle; a plurality of pipes leading into said tube for introducing purification liquid therein; check valve means in said upstream end for admitting purification liquid from said tank and for preventing backflow of gas and liquid; liquid inlet, outlet and overflow means disposed in said tank; a vertical open tube in the shape of an inverted funnel disposed above said downstream end having its lower end below the liquid level, receiving at least part of gas and liquid mixed within said horizontal tube, said mixture due to the gas injection means being under sufficient pressure to cause a rise of its level in said vertical tube above the liquid level in said horizontal tube; and a plurality of apertures in said vertical tube above the liquid level in said horizontal tube, said apertures emitting liquid separated from gas; said gas escaping through the top of said open vertical tube.

References Cited by the Examiner

UNITED STATES PATENTS

| 631,460 | 8/1899 | Evans | 55—255 |
|---|---|---|---|
| 1,143,162 | 6/1915 | Armstrong | 261—77 |
| 1,563,125 | 11/1925 | Ward | 55—257 |
| 1,574,783 | 3/1926 | Beth | 261—77 |
| 1,939,949 | 12/1933 | Bertram | 261—121 |
| 2,633,344 | 3/1954 | Rekk | 261—76 |
| 2,715,521 | 8/1955 | Tatibana | 261—123 X |
| 3,063,686 | 11/1962 | Irvin | 261—123 |

HARRY B. THORNTON, *Primary Examiner.*